(12) United States Patent
Leclerc et al.

(10) Patent No.: US 6,744,988 B2
(45) Date of Patent: Jun. 1, 2004

(54) DEVICE FOR APPLYING TIME-DELAYS TO OPTICAL SIGNALS

(75) Inventors: Olivier Leclerc, Saint Michel S/Orge (FR); Patrick Brindel, Longpont S/Orge (FR); Emmanuel Desurvire, Bruyeres le Chatel (FR); Denis Penninckx, Nozay (FR)

(73) Assignee: Alcatel, Paris (FR)

( * ) Notice: Subject to any disclaimer, the term of this patent is extended or adjusted under 35 U.S.C. 154(b) by 492 days.

(21) Appl. No.: 09/740,953

(22) Filed: Dec. 21, 2000

(65) Prior Publication Data

US 2001/0005271 A1 Jun. 28, 2001

(30) Foreign Application Priority Data

Dec. 23, 1999 (FR) .............................. 99 16332

(51) Int. Cl.[7] .............................. H04J 14/08; H04J 4/00
(52) U.S. Cl. ......................................... 398/102; 398/75
(58) Field of Search ................................ 398/175, 176, 398/47, 147, 75, 102

(56) References Cited

U.S. PATENT DOCUMENTS

| | | | |
|---|---|---|---|
| 5,526,170 A | | 6/1996 | Esman et al. |
| 5,684,615 A | * | 11/1997 | Blow et al. .................. 398/179 |
| 5,737,106 A | | 4/1998 | Sansonetti et al. |
| 5,953,138 A | * | 9/1999 | Ellis ............................ 398/75 |
| 5,999,292 A | * | 12/1999 | Dennis et al. .............. 398/101 |
| 6,115,173 A | * | 9/2000 | Tanaka et al. .............. 359/333 |
| 6,532,091 B1 | * | 3/2003 | Miyazaki et al. ........... 398/175 |

OTHER PUBLICATIONS

K. S. Jepsen et al, "All Optical Network Interface for Bit Synchronization and Regeneration", ECOC, Sep. 22–25, 1997, pp. 89–92 XP002141775.
Patent Abstracts of Japan, vol. 010, No. 217 (E–423), Jul. 29, 1986 corresponding to JP 61 053893 A (Nippon Telegraph & Telephone Corp) dated Mar. 17, 1986.

* cited by examiner

*Primary Examiner*—Jason Chan
*Assistant Examiner*—Shi K. Li
(74) *Attorney, Agent, or Firm*—Sughrue Mion, PLLC

(57) ABSTRACT

To delay optical signals precisely and continuously in a very small dynamic range, a device for applying a time-delay to optical signals includes a first phase modulator to receive an input optical signal carried by an original center wavelength and to apply a first stage of phase modulation to the carrier wave of the input signal to supply a first intermediate signal carried by a modified center wavelength, a delaying dispersive member having chromatic dispersion to receive the first intermediate signal and to supply a second intermediate signal, and a second phase modulator to receive the second intermediate signal and to apply a second stage of phase modulation to the carrier wave of the second intermediate signal to supply an output signal carried by the original center wavelength. Applications include optical telecommunication systems, in particular converting wavelength division multiplexed signals into time division multiplexed signals and regenerating wavelength division multiplexed signals.

24 Claims, 4 Drawing Sheets

DEVICE FOR APPLYING TIME-DELAYS TO OPTICAL SIGNALS

BACKGROUND OF THE INVENTION

1. Field of the Invention

The present invention relates to a device for applying time-delays to optical signals, in particular to signals conveyed by an optical data transmission system.

2. Description of the Prior Art

In some applications in optical telecommunication systems it is important to be able to apply time-delays to optical signals precisely and continuously within a very small dynamic range. For example, the range for binary signals at a bit rate of 40 Gbit/s has a duration of approximately 25 ps when it is necessary to be able to adjust a time-delay to a duration of the order of one bit period.

Time-delays with such characteristics are useful for converting wavelength division multiplexed (WDM) signals into time division multiplexed (TDM) signals, for example.

Another application is to regenerate WDM signals by resynchronizing the spectral channels before synchronous reshaping modulation is applied by a common modulator.

On the application of time-delays, see for example the articles by N. V. JESPERSEN, A. C. HEATH and E. S. ROLLER, SPIE, vol 756, p 156 (1987) and P. R. HERCZFELD et al., "Wide-band true time-delay phase shifter devices", Proc. IEEE MTT-5 International Microwave Symposium Digest, Las Vegas, Nev., Jun. 1987, pp 603–606, which describe delay lines in which the time-delay can be changed by stretching the time-delay fiber.

Wrapping an optical fiber onto a piezo-electric mandrel provides an electrical way to control the length of the fiber. Relative variations of length of the order of $10^{-3}$ can be obtained by this method, enabling a time-delay of 100 ps to be obtained with a few tens of meters of fiber. A delay line of the above kind therefore provides continuous time-delays.

The above solution nevertheless has a number of drawbacks: the high control voltages needed (of the order of 1 kV), the hysteresis of piezo-electric stretching, and the fact that the response time is long because the time-delay control bandwidth is limited by the mechanical inertia of the mandrel (to at best a few tens of kilohertz). A delay line of the above kind also consumes a large amount of energy under dynamic conditions, due to the high capacitance of piezo-electric elements. A device of the above kind is also heavy, because it comprises not only the necessary length of fiber but also the piezo-electric mandrel.

Another prior art solution uses a thermally controlled delay line with a typical sensitivity of 50 ps/° C.km. A 25 ps range of time-delays can be covered with a fiber 50 m long and a thermostatically controlled device whose temperature can be varied within a range of 10° C.

However, this solution has a high inertia and is subject to serious temperature stabilization problems.

The present invention aims to alleviate the problems of the aforementioned devices by proposing a device for applying a time-delay that is easy to use and accurate and has a very low inertia.

A supplementary object of the invention is to provide a device whose performance is only slightly dependent on the polarization of the optical signals supplied to the input.

SUMMARY OF THE INVENTION

Accordingly, the invention provides a device for applying a time-delay to optical signals taking the form of modulation of a carrier wave having a center wavelength, which device includes:

a first phase modulator adapted to receive an input optical signal carried by an original center wavelength and to apply a first stage of phase modulation to the carrier wave of the input signal to supply a first intermediate signal carried by a modified center wavelength, a delaying dispersive member having chromatic dispersion and adapted to receive the first intermediate signal and to supply a second intermediate signal, and a second phase modulator adapted to receive the second intermediate signal and to apply a second stage of phase modulation to the carrier wave of the second intermediate signal to supply an output signal carried by the original center wavelength.

The device according to the invention can have one or more of the following features:

it further includes a control unit for the first and second phase modulators adapted to adjust the depths of phase modulation respectively applied to the input signal and to the second intermediate signal;

the input signal is a binary signal having a particular bit period and the control unit is adapted to control the first and second phase modulators periodically with a period equal to the bit period;

the maximum depth of phase modulation respectively applied to the input signal and to the second intermediate signal and/or the chromatic dispersion of the delaying dispersive member are chosen to obtain a range of time-delays which is at least equal to the bit period;

it further includes means for modifying the chromatic dispersion of the delaying dispersive member.

each of the first and second phase modulators is adapted to apply to the optical signals phase modulations which are substantially independent of the state of polarization of the signals.

Thus the invention exploits the property of dispersive media, such as dispersive fibers or fibers with a photo-written Bragg grating, of imposing on an optical wave passing through them a propagation speed which is dependent on the wavelength (or the optical frequency) of the wave. Because of the first phase modulator, the modification applied to the wavelength of the wave carrying the pulses constituting an input optical signal can be adjusted to vary the propagation time of those pulses in the delaying dispersive medium. By opposite phase modulation the second phase modulator returns the wavelength to its original value.

Note that this solution is very suitable for optical signals with RZ amplitude modulation because the phase modulation can be applied very simply using a clock signal at the bit frequency. For other types of modulation, such as NRZ amplitude modulation, there are additional constraints with regard to the phase modulators because the maximum phase variation to be applied is greater.

For the standard signals referred to above, it is known in the art that dispersive media widen the optical pulses. The presence of a dispersive member in the device according to the invention must also be taken into account in some situations in which the chromatic dispersion of the delaying dispersive member must be high to provide a wide range of time-delays. Compensation is required in particular if the pulses at the output of the delaying dispersive medium have widths which are incompatible with the phase modulation applied by the second modulator because of chromatic dispersion.

The chromatic dispersion coefficient D of a medium is related to its propagation constant β by the equation:

$$d^2\beta/d\omega^2 = -(2\pi c/\omega^2)D,$$

in which ω is the angular frequency of the optical wave and c is the speed of light in a vacuum.

As a general rule, the coefficient D can be positive, zero or negative according to the wavelength and the medium used. For standard fibers, for example, the chromatic dispersion is approximately +17 ps/(km.nm) at a wavelength of 1.5 μm.

A chromatic dispersion value is defined for a homogeneous or non-homogeneous dispersive member, for example a link incorporating a dispersive fiber, which can be expressed mathematically by the following equation:

$$DL = \int D(z) \cdot dz \qquad (1)$$

where z is the abscissa of a point along the dispersive medium, D(z) is its chromatic dispersion parameter at abscissa z, and the integral which expresses the dispersion DL is calculated along the propagation path of waves in the dispersive medium.

Likewise, if a link consists of a plurality of dispersive members connected in cascade, a cumulative chromatic dispersion can be defined for the link as the algebraic sum of the chromatic dispersions of the various members that form the link.

To solve the problem of possible widening of the optical pulses referred to above, the device in accordance with the invention can further include a second dispersive member disposed to derive the input signal of the first phase modulator from an optical signal to be delayed, the second dispersive member having a chromatic dispersion of opposite sign to the chromatic dispersion of the delaying dispersive member and whose absolute value is less than that of the delaying dispersive member.

This ensures that the absolute value of the cumulative chromatic dispersion evaluated on the basis of the signal to be delayed up to each of the phase modulators remains below the absolute value of the chromatic dispersion of the delaying dispersive member.

Of course, the foregoing arrangements imply that the pulses of the signal to be delayed are not widened by a dispersive member upstream of the device, i.e. a dispersive transmission link such as a standard fiber.

If this is not the case, the device according to the invention includes a second dispersive member disposed to derive input signal to the first phase modulator from a signal emitted by an optical link, the second dispersive member having a chromatic dispersion such that the cumulative chromatic dispersion of the optical link and the second dispersive member is of opposite sign to the chromatic dispersion of the delaying dispersive member and the absolute value of the cumulative chromatic dispersion is less than that of the delaying dispersive member.

The second dispersive member is essential only if the cumulative chromatic dispersion upstream of each phase modulator, evaluated on the basis of the signal to be delayed or the signal transmitted, is sufficient to widen the pulses significantly. The second dispersive member can also be dispensed with if the input signal consists of a stream of soliton pulses and the chromatic dispersion of the delaying dispersive member is positive.

The invention further provides a converter for converting wavelength division multiplexed optical signals into time division multiplexed optical signals including at least one device as defined above.

Other advantages and features of the invention will become apparent on reading the following description, which is given by way of non-limiting example and with reference to the accompanying drawings.

DETAILED DESCRIPTION OF THE PREFERRED EMBODIMENT

Figure 1:
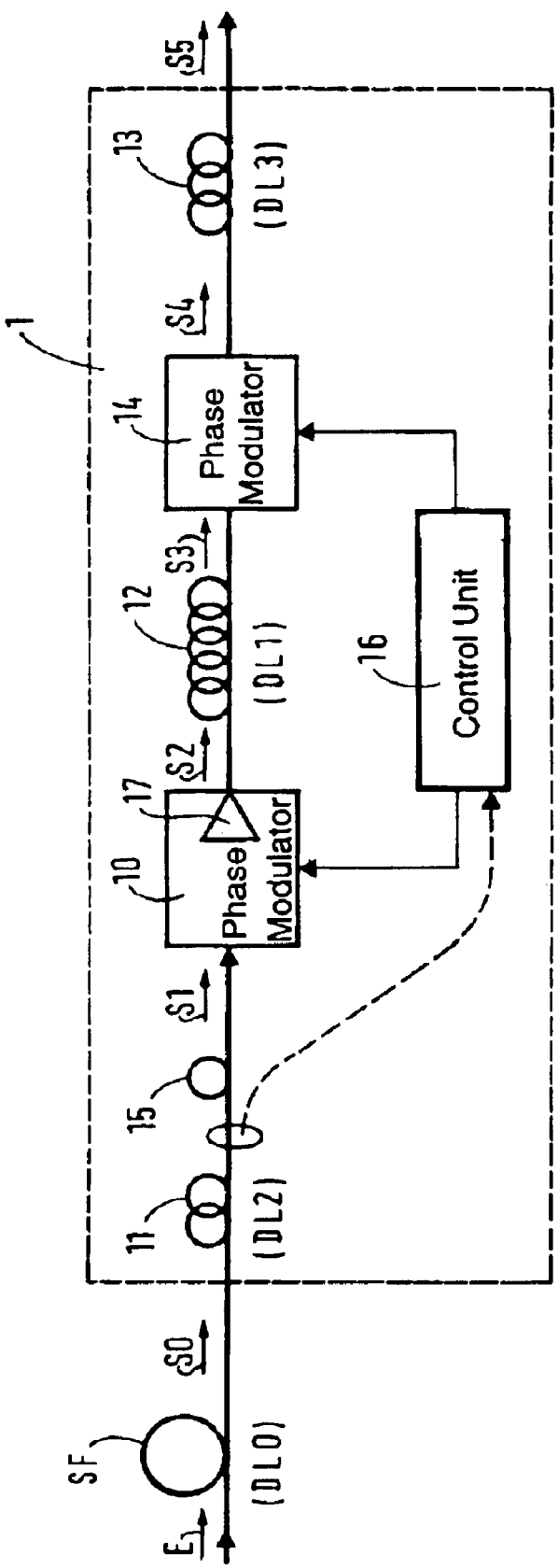
FIG. 1 is a block diagram of a device according to the invention.

FIG. 1 shows a device 1 in accordance with the invention for applying a time-delay. By way of illustration, the device is on the downstream side of a transmission line SF transmitting optical signals E.

The device 1 includes a first optical phase modulator 10 receiving an input optical signal S1 carried by an initial center wavelength. The modulator 10 is adapted to apply a first stage of phase modulation to the carrier wave of the signal S1 to produce an intermediate signal S2 carried by a modified center wavelength.

The output of the phase modulator 10 is coupled to a dispersive member 12 consisting of a dispersive optical fiber, for example.

The fiber 12 plays the role of the delaying fiber because it has a dispersion DL1 whose effect is to make the propagation time of the signal S2 passing through it dependent on the shift of the center wavelength applied by the first phase modulator 10.

The signal leaving the fiber 12 constitutes a second intermediate signal S3 which is received by a second phase modulator 14 coupled to the output of the delaying fiber 12.

The second phase modulator 14 is substantially identical to the first modulator 10, but is adapted to perform phase modulation complementary to that performed by the first modulator 10, in order to return the center wavelength of the signal S4 supplied at the output to the original center wavelength.

A control unit 16 associated with the phase modulators 10 and 14 applies appropriate control voltages to them. For synchronized control, the unit 16 receives a signal representative of the modulation of the signal S1, as symbolized by the dashed line arrow.

The components of the device mentioned above are well known in the optical transmission art.

The phase modulators are preferably insensitive to polarization, i.e. they apply the same phase modulation to optical waves passing through them regardless of the state of polarization of those waves.

Also, it is preferable to use for the dispersive member 12 a fiber-based component incorporating a photo-written Bragg grating of variable period (also referred to as a "chirped" grating), rather than the usual dispersive fiber. These components operate by reflection and impose on the spectral components of an injected wave optical paths which depend on their wavelength. These components have the advantage that for a given chromatic dispersion the length of fiber needed is much less than that of the usual dispersive fiber. As a result operation is much more stable in the event of temperature fluctuations.

Figure 2:
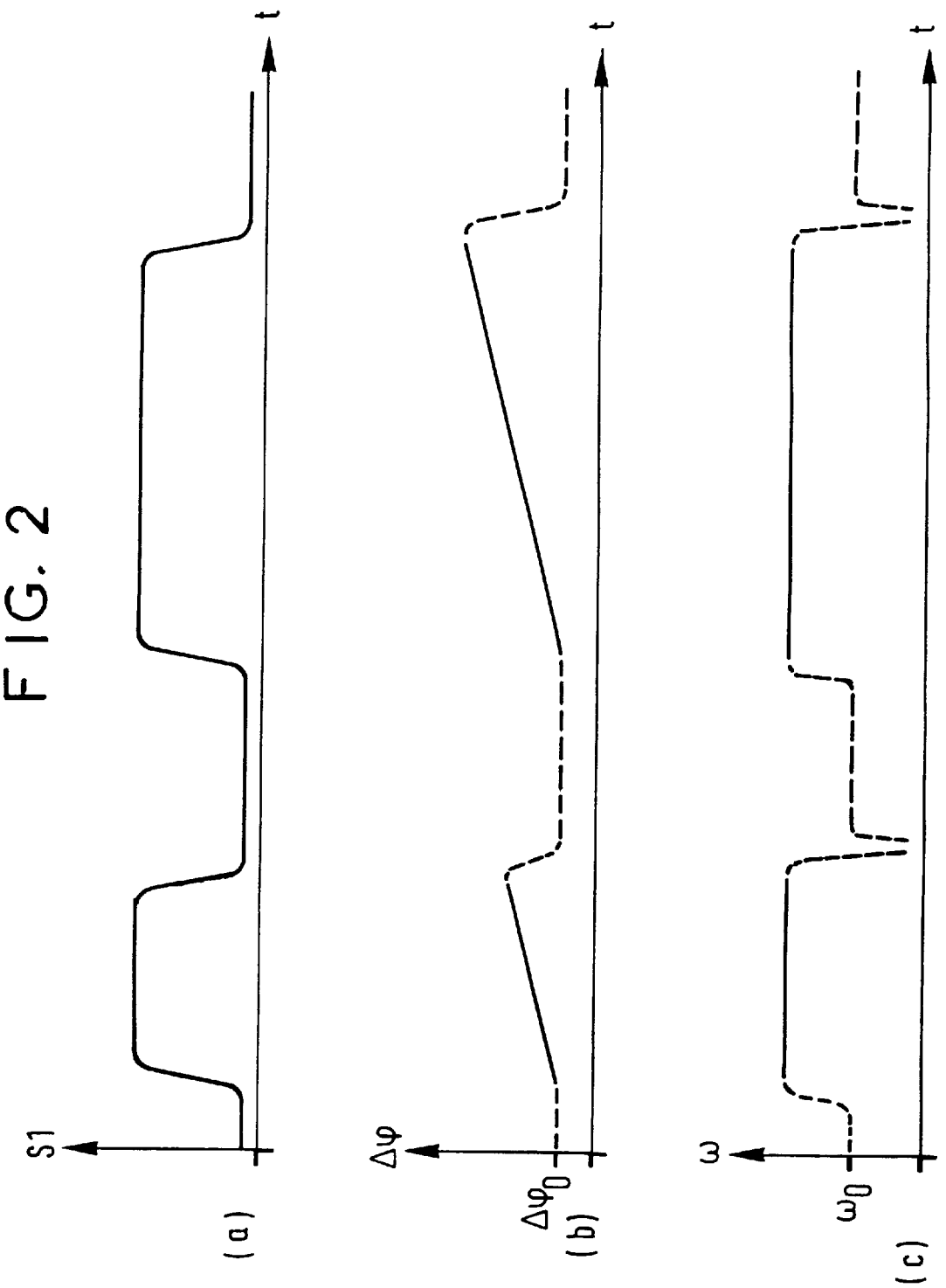
FIGS. 2 and 3 are timing diagrams used to explain how the device according to the invention works.
Figure 3:
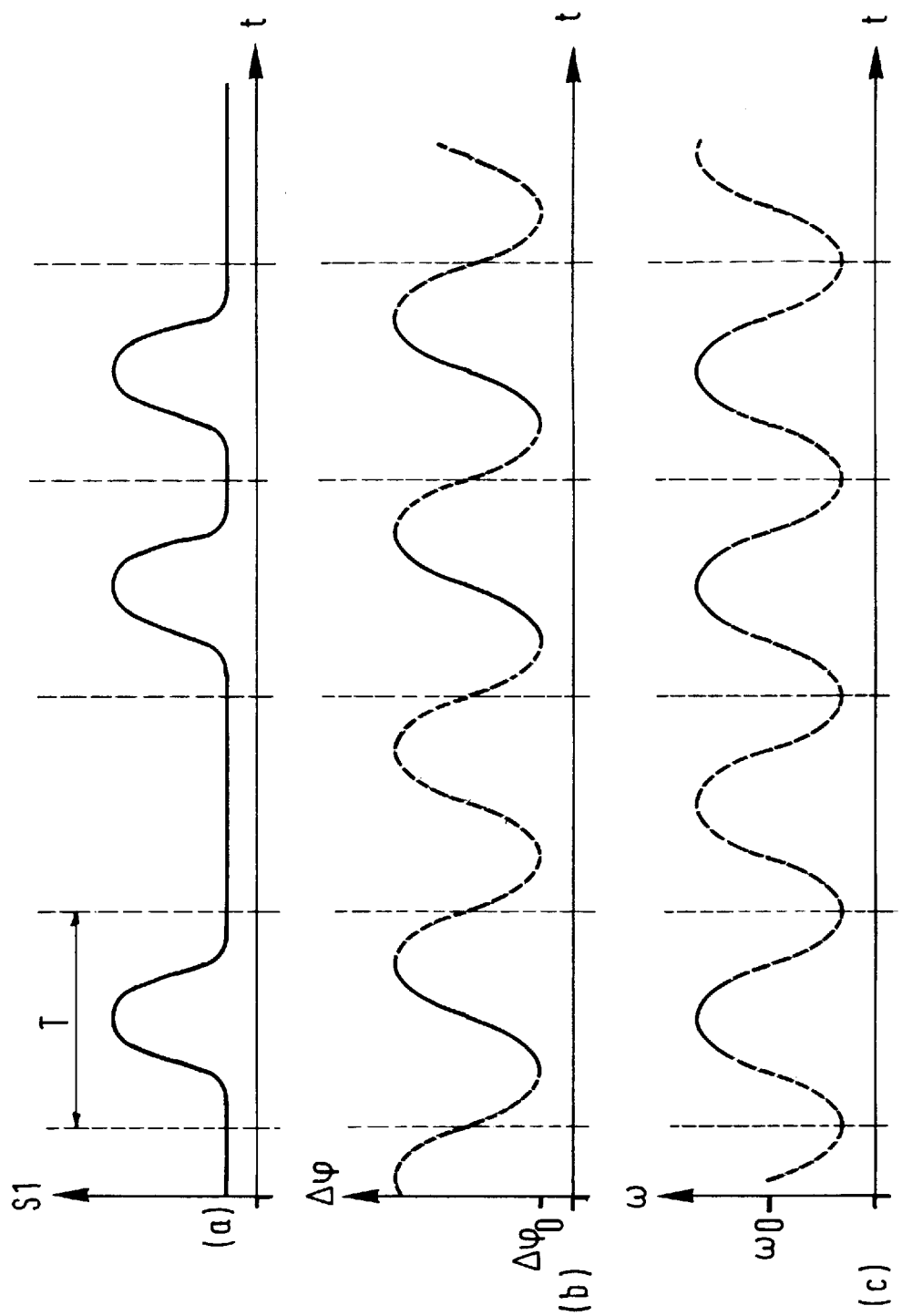

The timing diagrams shown in FIGS. 2 and 3 are used to explain the operating principle of the device according to the invention.

FIG. 2 corresponds to a situation in which the input signal S1 takes the form of any kind of amplitude modulation of a carrier wave whose wavelength corresponds to an angular frequency ω0. The timing diagram (a) shows one example of the variation of the amplitude of the signal S1 as a function of time t.

At the output of the modulator 10 the signal S2 has a similar analog modulation and can be expressed as a function of time t in the form:

$$S2=A(t)\cos(\omega 0.t+\Delta\phi)$$

where A(t) is the modulated amplitude, ω0 the angular frequency of the input signal S1 and Δφ the phase shift between the signals S2 and S1 created by the modulator.

If the control input of the modulator 10 is not modulated, the signal S2 retains the angular frequency ω of the input signal S1.

If the control input of the modulator 10 is modulated, however, Δφ varies as a function of time and the angular frequency of the signal S2 becomes:

$$\omega=\omega 0+d(\Delta\phi)/dt$$

Accordingly, by controlling the modulator 10 so that the variations as a function of time t of the phase shift Δφ hove a non-zero slope d(Δφ)/dt, the angular frequency ω of the carrier wave of S2 is shifted relative to ω0 by an amount proportional to that slope. In particular, if the slope is constant, the shift between ω and ω0 is constant.

In practice, because the phase cannot be increased or decreased indefinitely, the phase shift Δφ is modulated so that the shift has the required slope during each pulse of the input signal S1, an opposite shift being produced during low levels of the optical power of the signal. Phase modulation at substantially constant slope during the pulses is shown in timing diagram (b). The resulting variation of the angular frequency ω as a function of time t is shown by the timing diagram (c).

The control unit must produce phase modulation synchronized with the amplitude modulation of the input signal S1, as symbolized by the dashed line arrow in FIG. 1. If necessary, to allow for the time needed for electronic processing by the unit 16, the signal S1 could be delayed by an appropriate fixed time-delay 15 before injecting it into the modulator 10.

Compared to a signal that has not been phase-modulated, the pulses of the signal S3 leaving the delaying fiber 12 have a time-delay or an advance proportional to the absolute values of the chromatic dispersion DL1 of the delaying fiber and the phase-shift between the angular frequencies ω and ω0. Also, a delay or an advance is obtained according to the signs of the chromatic dispersion DL1 and the phase-shift between the angular frequencies.

The figure does not show the phase modulation effected by the second phase modulator 14, which is simply complementary to that performed by the first modulator.

Thus the relative time-delay applied to the input signal depends on three parameters, namely:

the chromatic dispersion coefficient D of the delaying fiber, its length, and the slope d(Δφ)/dt of the phase-shift Δφ as a function of time t.

It is therefore possible to determine the time-delay variation range by choosing the type and length of dispersive fiber and the slope as a function of time of the control input to the modulator 10.

The time-delay can be adjusted dynamically by acting dynamically on the chromatic dispersion DL1, for example by controlled stretching and/or contraction of the fiber by means of an electromechanical actuator. This is known in the art. However, adjustment by controlling the modulator may be preferable for reasons of speed and accuracy. In this case, the control unit 16 must apply the appropriate control voltages to the phase modulators 10 and 14 to adjust the depth of phase modulation.

FIG. 3 corresponds to a situation in which the input signal S1 (timing diagram (a)) has an RZ modulation format clocked by a clock of period T defining the bit period. In this case, the phase modulation can take the form of a periodic variation of period T, ideally with a sawtooth waveform, whose rising (or falling) edges are locked inside the pulses of the signal. It is necessary to provide electrical or optical time-delay means to synchronize the control signals of the modulators 10 and 14 so that the pulses of the RZ input signal S1 are centered in the respectively increasing (or decreasing) part and the decreasing (or increasing) part of the phase variations applied by the respective modulators.

In practice, and especially at high bit rates, it is easier to obtain electrical control voltages which feature substantially sinusoidal modulation, derived from a clock signal at the bit frequency, as shown in the timing diagram (b). If the clock signal is not available to the device, it can be created from the input signal S1 by a clock recovery device included in the control unit 16, as symbolized by the dashed line arrow in FIG. 1.

The timing diagram (c) shows that the angular frequency shift is not constant but that its fluctuations are reduced as the width of the pulses of the signal is reduced.

As previously explained, if the chromatic dispersion of the delaying fiber 12 must be taken into account to limit the widening of the pulses of the signal S3 applied to the second phase modulator 14, a precompensating dispersive member 11 is provided on the upstream side of the first phase modulator 10. The second dispersive member 11 provides an input signal S1 in the form of a precompensated signal derived from the optical signal S0 to be delayed.

The precompensator dispersive member 11 has a chromatic dispersion DL2 of opposite sign to and lower absolute value than the chromatic dispersion DL1 of the delaying dispersive member 12.

A compromise is achieved if the phase modulators receive pulses that have been widened by substantially the same amount. To achieve this the second dispersive member 11 has a chromatic dispersion DL2 whose absolute value is substantially equal to half that DL1 of the delaying dispersive member 12.

Of course, the second dispersive member is essential only if the cumulative chromatic dispersion on the upstream side of each phase modulator, evaluated on the basis of the signal to be delayed or the signal transmitted, is sufficient to widen the pulses significantly.

The problem of widening due to the delaying dispersive member may be absent or at least reduced if the input signal is a stream of soliton pulses or similar pulses. Provided that a delaying dispersive member is chosen that has a positive chromatic dispersion, the widening of the pulses due to chromatic dispersion is compensated in this member by non-linear effects (the Kerr effect). However, the amplitude of the pulses of the signal injected into the delaying dispersive member must be sufficiently high to generate the non-linear phenomena. If necessary, an optical amplifier 17 can be provided on the upstream side of the delaying dispersive member.

In a different context, in which the signal available at the time-delay device is a signal received after transmission over a dispersive optical link SF, such as a standard fiber, the signal may be subject to widening that must be taken into account.

In this case, the second dispersive member 11 is disposed between the end of the optical link SF and the first phase modulator 10 and its chromatic dispersion DL2 is chosen so that the cumulative chromatic dispersion DL0+DL2 of the optical link SF and the second dispersive member 11 is of opposite sign to and lower absolute value than the chromatic dispersion DL1 of the delaying dispersive member 12.

Similarly, for the phase modulators to receive pulses that have been widened by substantially the same amount, the second dispersive member 11 has a chromatic dispersion DL2 such that the absolute value of the cumulative chromatic dispersion is substantially equal to half that DL1 of the delaying dispersive member 12.

Finally, in the situation where the device according to the invention must supply a signal whose pulses are not widened, as is the case for WDM-TDM conversion, a compensator third dispersive member 13 is preferably provided. It receives the output signal S4 and supplies a compensated output signal S5.

The third dispersive member 13 is chosen to have a chromatic dispersion DL3 such that the cumulative chromatic dispersion of the second dispersive member 11, the delaying dispersive member 12, the compensator third dispersive member 13 and where applicable the optical link SF is substantially zero.

Figure 4:
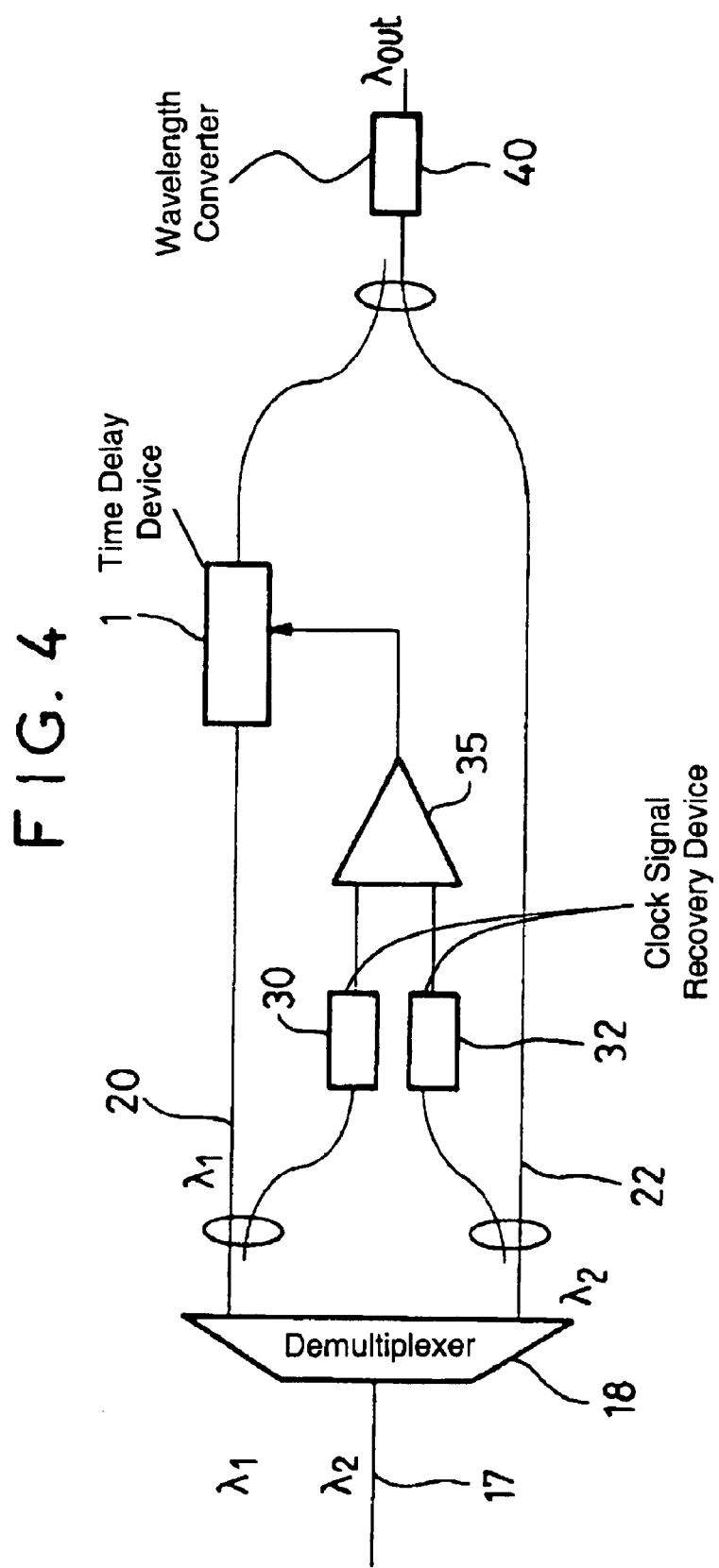
FIG. 4 is a block diagram of a converter for converting WDM optical signals into TDM optical signals.

FIG. 4 shows a converter for converting WDM optical signals into TDM optical signals. The converter has an input link 17 receiving a WDM optical signal. For clarity, it is assumed that the WDM signal has two channels respectively corresponding to a first spectral component at wavelength $\lambda 1$ and a second spectral component at wavelength $\lambda 2$ and each taking the form of RZ modulation.

The input link 17 is coupled to an input of a demultiplexer 18 one output of which is coupled to an optical link 20 which carries the spectral component of wavelength $\lambda 1$ and whose other output is coupled to an optical link 22 which carries the spectral component of wavelength $\lambda 2$.

The optical link 20 incorporates a device 1 in accordance with the invention in order to be able to apply to the spectral component $\lambda 1$ therein a time-delay for interleaving the two spectral components temporally.

The links 20 and 22 are optically coupled downstream of the device 1. The spectral components on the same optical link are introduced into a wavelength converter unit 40. The unit 40 converts the signals at wavelength $\lambda 1$ and the signals at wavelength $\lambda 2$ into an optical signal at wavelength $\lambda$out constituting the TDM signal.

The control signal for the device 1 according to the invention is obtained by sampling from the optical links 20 and 22 a small portion of the optical signals from the demultiplexer 18 and introducing the sampled signals into respective clock signal recovery devices 30 and 32.

The respective outputs of the circuits 30 and 32 are connected to a differential amplifier 35 or a phase comparator whose output supplies to the device 1 according to the invention a set point signal such that the optical pulses on the two links 20 and 22 are time-shifted relative to each other before wavelength conversion in the unit 40, preferably by half the bit period.

The clock signal could instead be recovered from the signal leaving the device 1.

Of course, if the WDM signal has more than two channels, it is sufficient to adapt the demultiplexer accordingly and to take as reference an optical link with its clock signal, the optical signals on the other links at the output of the demultiplexer being respectively delayed by a sub-multiple of the bit period relative to the reference clock signal.

What is claimed is:

1. A device for applying a time-delay to optical signals taking the form of modulation of a carrier wave having a center wavelength, said device comprising:
   a first phase modulator adapted to receive an input optical signal carried by an original center wavelength and to apply a first stage of phase modulation to the carrier wave of said input signal to supply a first intermediate signal carried by a modified center wavelength,
   a delaying dispersive member able to create chromatic dispersion and adapted to receive said first intermediate signal and to supply a second intermediate signal, and
   a second phase modulator adapted to receive said second intermediate signal and to apply a second stage of phase modulation to the carrier wave of said second intermediate signal to supply an output signal carried by said original center wavelength.

2. The device claimed in claim 1 further comprising:
   a control unit for said first and second phase modulators adapted to adjust the depths of phase modulation respectively applied to said input signal and to said second intermediate signal.

3. The device claimed in claim 2 wherein said input signal is a binary signal having a particular bit period and said control unit is adapted to control said first and second phase modulators periodically with a period equal to said bit period.

4. The device claimed in claim 3 wherein the maximum depth of phase modulation respectively applied to said input signal and to said second intermediate signal and/or the chromatic dispersion of said delaying dispersive member are chosen to obtain a range of time-delays which is at least equal to said bit period.

5. The device claimed in claim 1 further comprising means for modifying the chromatic dispersion of said delaying dispersive member.

6. The device claimed in claim 1 wherein each of said first and second phase modulators is adapted to apply to said optical signals phase modulations which are substantially independent of the state of polarization of said signals.

7. The device for applying a time-delay to optical signals according to claim 6, wherein said first phase modulator and said second phase modulator apply the same phase modulation to the optical signals passing through said first phase modulator and said second phase modulator regardless of the state of polarization.

8. The device claimed in claim 1 further including a second dispersive member adapted to derive said input signal to said first phase modulator from an optical signal to be delayed, wherein said second dispersive member has a chromatic dispersion of opposite sign to and lower absolute value than the chromatic dispersion of said delaying dispersive member.

9. The device claimed in claim 8 wherein said second dispersive member has a chromatic dispersion whose absolute value is substantially equal to half that of said delaying dispersive member.

10. The device claimed in claim 8 further comprising:

a compensator third dispersive member disposed to receive said output signal and to supply a compensated output signal.

11. The device claimed in claim 1 further comprising:

a second dispersive member adapted to derive said input signal to said first phase modulator from a signal transmitted via an optical link, wherein said second dispersive member has a chromatic dispersion such that the cumulative chromatic dispersion of said optical link and said second dispersive member is of opposite sign to and lower absolute value than that of the chromatic dispersion of said delaying dispersive member.

12. The device claimed in claim 11 wherein said absolute value of said cumulative chromatic dispersion is substantially equal to half that of said delaying dispersive member.

13. The device for applying a time-delay to optical signals according to claim 1, wherein said delaying dispersive member comprises:

a fiber based component incorporating a photo-written Bragg grating of variable period.

14. A converter for converting wavelength division multiplexed optical signals into time division multiplexed optical signals, said converter comprising at least one device for applying a time-delay to optical signals taking the form of modulation of a carrier wave having a center wavelength, said device comprising:

a first phase modulator adapted to receive an input optical signal carried by an original center wavelength and to apply a first stage of phase modulation to the carrier wave of said input signal to supply a first intermediate signal carried by a modified center wavelength, a delaying dispersive member able to create chromatic dispersion and disposed to receive said first intermediate signal and to supply a second intermediate signal, and a second phase modulator adapted to receive said second intermediate signal and to apply a second stage of phase modulation to the carrier wave of said second intermediate signal to supply an output signal carried by said original center wavelength.

15. The converter claimed in claim 14 wherein said device further comprises:

a control unit for said first and second phase modulators adapted to adjust the depths of phase modulation respectively applied to said input signal and to said second intermediate signal.

16. The converter claimed in claim 15 wherein said input signal is a binary signal comprising a particular bit period and said control unit is adapted to control said first and second phase modulators periodically with a period equal to said bit period.

17. The converter claimed in claim 16 wherein the maximum depth of phase modulation respectively applied to said input signal and to said second intermediate signal and/or the chromatic dispersion of said delaying dispersive member are chosen to obtain a range of time-delays which is at least equal to said bit period.

18. The converter claimed in claim 14 wherein said device further comprises:

means for modifying the chromatic dispersion of said delaying dispersive member.

19. The converter claimed in claim 14 wherein each of said first and second phase modulators is adapted to apply to said optical signals phase modulations which are substantially independent of the state of polarization of said signals.

20. The converter claimed in claim 14 wherein said device further comprises:

a second dispersive member adapted to derive said input signal to said first phase modulator from an optical signal to be delayed, wherein said second dispersive member has a chromatic dispersion of opposite sign to and lower absolute value than the chromatic dispersion of said delaying dispersive member.

21. The converter claimed in claim 20 wherein said second dispersive member has a chromatic dispersion whose absolute value is substantially equal to half that of said delaying dispersive member.

22. The converter claimed in claim 20 wherein said device further comprises a compensator third dispersive member disposed to receive said output signal and to supply a compensated output signal.

23. The converter claimed in claim 14 wherein said device further comprises:

a second dispersive member adapted to derive said input signal to said first phase modulator from a signal transmitted via an optical link, wherein said second dispersive member has a chromatic dispersion such that the cumulative chromatic dispersion of said optical link and said second dispersive member is of opposite sign to and lower absolute value than that of the chromatic dispersion of said delaying dispersive member.

24. The converter claimed in claim 23 wherein said absolute value of said cumulative chromatic dispersion is substantially equal to half that of said delaying dispersive member.

* * * * *